United States Patent
Di Meo et al.

(10) Patent No.: US 6,919,479 B2
(45) Date of Patent: Jul. 19, 2005

(54) PROCESS FOR THE PREPARATION OF PERFLUOROPOLYETHERS ACYL-FLUORIDE ENDED BY REDUCTION OF THE CORRESPONDING PEROXIDIC PERFLUOROPOLYETHERS

(75) Inventors: Antonella Di Meo, Milan (IT); Rosaldo Picozzi, Milan (IT); Claudio Tonelli, Milan (IT)

(73) Assignee: Solvay Solexis S.p.A., Milan (IT)

( * ) Notice: Subject to any disclaimer, the term of this patent is extended or adjusted under 35 U.S.C. 154(b) by 47 days.

(21) Appl. No.: 10/631,862

(22) Filed: Aug. 1, 2003

(65) Prior Publication Data

US 2004/0024153 A1 Feb. 5, 2004

(30) Foreign Application Priority Data

Aug. 1, 2002 (IT) ..................... MI2002A1733

(51) Int. Cl.⁷ .............................. C07C 51/09
(52) U.S. Cl. ................ 562/849; 562/850; 562/858
(58) Field of Search .............. 562/849, 850, 562/852

(56) References Cited

U.S. PATENT DOCUMENTS

| | | | |
|---|---|---|---|
| 3,847,978 A | 11/1974 | Mensi et al. ........... | 562/577 |
| 4,755,330 A | 7/1988 | Viola et al. ........... | 562/849 |
| 4,788,257 A | 11/1988 | Caporiccio et al. ......... | 525/403 |
| 5,164,517 A | 11/1992 | Marchionni et al. ........ | 549/380 |

FOREIGN PATENT DOCUMENTS

| | | | |
|---|---|---|---|
| EP | 0 349 115 A1 | 1/1990 | ........... C07C/19/08 |
| EP | 0 571 809 A2 A | 12/1992 | ......... C07C/69/708 |
| WO | WO 98/37043 A | 8/1998 | |

*Primary Examiner*—Rosalynd Keys
(74) *Attorney, Agent, or Firm*—Arent Fox PLLC

(57) ABSTRACT

A process for the preparation of perfluoropolyethers of formula:

$$\text{T-CFX'}-\text{O}-\text{R}_f-\text{CFX}-\text{COF} \qquad (I)$$

wherein:

T=COF, F, $C_1$–$C_3$ perfluoroalkyl;

X, X'=—F, —$CF_3$;

$R_f$=—$(C_2F_4O)_m(CF_2CF(CF_3)O)_n(CF_2O)_p(CF(CF_3)O)_q$—, the sum n+m+p+q ranges from 2 to 200, by reduction with hydrogen of the corresponding peroxidic perfluoropolyethers, in the presence of a catalyst formed by metals of the VIII group supported on metal fluorides, at a temperature from 20° C. to 140° C., and at a pressure between 1 and 50 atm.

16 Claims, No Drawings

PROCESS FOR THE PREPARATION OF PERFLUOROPOLYETHERS ACYL-FLUORIDE ENDED BY REDUCTION OF THE CORRESPONDING PEROXIDIC PERFLUOROPOLYETHERS

The present invention relates to a process for the preparation of perfluoropolyethers (PFPE) wherein at least one end group is an acyl fluoride —COF group.

More specifically the invention relates to a process for the preparation of perfluoropolyethers functionalized with —COF groups with substantially quantitative conversions and selectivity higher than 95%, preferably higher than 99%, starting from peroxidic perfluoropolyethers by reduction in the presence of catalysts, wherein the catalyst shows a very high duration, even over six months.

Processes for preparing perfluoropolyethers functionalized with —COF groups by subjecting perfluoropolyethers to a thermal treatment at a temperature in the range 150° C.–300° C. in the presence of fluorides, oxides, oxyfluorides of Al, Ti, V, Co or Ni, are known in the prior art. See for example U.S. Pat. No. 4,788,257 and U.S. Pat. No. 4,755,330. However in said processes a mixture of products is obtained wherein the amount of perfluoropolyethers containing —COF groups is at most 30% by moles.

The chemical reduction is also known, for example with iodides KI type or with an iodine/$SO_2$ mixture, in protic environment, of peroxidic perfluoropolyethers to give functional derivatives of the —COOR type wherein R is hydrogen or alkyl. The transformation of the —COOH end groups optionally obtained by hydrolysis of the corresponding esters into —COF groups is carried out by fluorination with suitable fluorinating agent (for example $SF_4$) or by chlorination with $SOCl_2$ and subsequent exchange of chlorine with fluorine by treatment with an inorganic fluoride. Said transformation requires complex and very expensive processes from an industrial point of view. Besides in said chemical reduction processes the use of a protic solvent is required with consequent increase of the environmental impact and of the total costs of the process. See for example U.S. Pat. No. 3,847,978.

A process is also known, for example from U.S. Pat. No. 3,847,978, for the preparation of functional perfluoropolyethers ended with the —COF group by reduction of peroxidic perfluoropolyethers with hydrogen in the presence of catalysts formed by metals of the VIII group in a finely subdivided form, optionally supported on carbon or on aluminum oxide, in the presence or in absence of a solvent or of a liquid dispersing agent. However said catalytic reduction process using the finely subdivided metals of the VIII group does not result advantageous since to obtain good reaction rates and complete peroxide conversion an high catalyst amount is required. This implies an increase of the production costs. Furthermore the use of finely subdivided metals causes problems in the plant running in the separation step of the reduction compound. Indeed in the compound filtration step there are significant catalyst losses unless very complicated systems are used for its recovery. This causes a further increase of the costs and a reduced system efficiency.

The use of supported metals on carbon and alumina, as described in said patent, is furthermore disadvantageous since it has been noticed a rapid decay of the catalytic activity in the time making the process industrially barely cheap.

It has been unexpectedly and surprisingly found that it is possible to avoid the drawbacks of the above prior art with significant advantages as regards the catalyst duration and the obtainment of high selectivities in functional perfluoropolyethers containing acyl fluoride —COF end groups with productivity equal to at least 1.2 kg of perfluoropolyether with —COF end groups for gram of catalyst.

It is therefore an object of the present invention a process for the preparation of functional perfluoropolyethers having at least one acyl-fluoride —COF end group of formula $$T\text{-}CFX'\text{—}O\text{—}R_f\text{—}CFX\text{—}COF \quad (I)$$

wherein:
T is equal to COF, F, $C_1$–$C_3$ perfluoroalkyl;
X, X', equal to or different from each other, are F or —$CF_3$;
$R_f$ is selected from:

—$(C_2F_4O)_m(CF_2CF(CF_3)O)_n(CF_2O)_p(CF(CF_3)O)_q$— wherein
the sum n+m+p+q ranges from 2 to 200,
the (p+q)/(m+n+p+q) ratio is lower than or equal to 10:100, preferably comprised between 0.5:100 and 4:100,
the n/m ratio ranges from 0.2 to 6, preferably from 0.5 to 3; m, n, p, q, are equal to or different from each other and when m, n range from 1 to 100, preferably from 1 to 80, then p, q range from 0 to 80, preferably from 0 to 50; the units with n, m, p, q indexes being statistically distributed along the chain, —$(CF_2CF_2CF_2O)_r$— wherein r ranges from 2 to 200,
—$(CF(CF_3)CF_2O)_s$— wherein s ranges from 2 to 200, by reduction of the corresponding perfluoropolyethers containing peroxidic bonds, obtainable by photooxidation of tetrafluoroethylene and/or perfluoropropene, using gaseous hydrogen in the presence of a catalyst comprising metals of the VIII group supported on metal fluorides, optionally in the presence of perfluorinated solvents inert under the reaction conditions, at a temperture from 20° C. to 140° C., preferably from 80° C. to 130° C. and at a pressure between 1 and 50 atm, preferably between 1 and 10 atm.

The hydrogenation reaction of the peroxidic groups can be schematically represented as follows:

$$\text{—}CF_2OOCF_2\text{—}+H_2 \text{ - - - >}\text{—}(CF_2OH)_2 \text{ - - - >}\text{—}(COF)_2+2HF$$

The process can be carried out in a continuous or discontinuous way, preferably by removing the HF formed during the reaction, for example by the same inlet hydrogen flow.

The preferred structures of the perfluorooxyalkylene chain $R_f$ are selected from the following:
—$(CF_2CF_2O)_m$—$(CF_2O)_p$—,
—$(CF_2CF(CF_3)O)_n$—$(CF_2O)_p$—$(CF(CF_3)O)_q$
wherein the indexes have the above meanings.

As metals of the VIII group, Pd, Pt, Rh, preferably Pd can be mentioned.

The preferred metal fluorides usable as supports are simple, complex metal fluorides or their mixtures, solid under the reaction conditions excluding those forming in the presence of HF stable hydrofluorides, such for example KF or NaF or showing a solubility in HF higher than 10% by weight.

More preferably the metal fluorides are selected from the group consisting of $CaF_2$, $BaF_2$, $MgF_2$, $AlF_3$, still more preferably $CaF_2$.

The concentration of the VIII group metal on the support is comprised beteeen 0.1% and 10% with respect to the catalyst total weight, preferably between 1% and 2% by weight.

The used catalyst amount is in the range 1%–10%, preferably 1%–5% by weight with respect to the peroxidic perfluoropolyether to be reduced.

Some illustrative but not limitative Examples of the invention follow.

EXAMPLES

The oxidizing power (OP) of the peroxidic perfluoropolyether, defined as grams of active oxygen for 100 grams of compound, is determined by reacting a known amount of peroxidic perfluoropolyether dissolved in an inert fluorinated solvent (Algofrene 113) with an alcoholic sodium iodide solution and potentiometrically titrating, with a solution having a known sodium thiosulphate titre, the iodine developed from said reaction.

The number average molecular weight, the content of —COF end groups and the $C_2F_4O/CF_2O$ ratio in the PFPE are determined by NMR$^{19}$F spectroscopy (Varian XL 200 spectrophotometer). The attributions of the peaks characteristic of the peroxidic PFPE and of the acyl fluoride PFPE are reported.

Peroxidic PFPE:

| | |
|---|---|
| –OO$\underline{CF}_2$OCF$_2$CF$_2$O– | chemical shift = –64.1 ppm |
| –OO$\underline{CF}_2$OCF$_2$O– | chemical shift = –66.1 ppm |
| –OO$\underline{CF}_2$CF$_2$OCF$_2$– | chemical shift = –95 ppm |

PFPE fluoride:

| | |
|---|---|
| –OCF$_2$CF$_2$O$\underline{CF}_2$COF | chemical shift = –77 ppm |
| –OCF$_2$O$\underline{CF}_2$COF | chemical shift = –79 ppm |
| –OCF$_2$CO$\underline{F}$ | chemical shift = +12 ppm |

Example 1

In a 0.5 l AISI 316 stirred, jacketed autoclave with heating/cooling possibility, equipped with:
bubbler with AISI filtering septum used both for the hydrogen or nitrogen introduction and for the compound filtration at the end of the reaction,
probe for the temperature determination,
condenser (gas/liquid separator) with return of the liquid phase into the autoclave and with the gas outlet connected through a pressure regulation valve to a disposal apparatus based on caustic potash circulation,
are introduced 10 g of catalyst formed by Pd supported on CaF$_2$, containing 1.5% by weight of Pd with respect to the catalyst weight, and 400 g of peroxidic perfluoropolyether obtained by photooxidation of the tetrafluoroethylene prepared according to U.S. Pat. No. 3,847,978, having a number average molecular weight equal to 83,400 wherein m/p= 0.75, and a (OP)=1.03.

The mixture is heated in nitrogen flow at 125°–130° C. and hydrogen is introduced for 30 minutes with a 15 NL/h flow at an operating pressure of 3 atm. It is cooled to 20° C. in nitrogen flow and samples are drawn to analytically check the oxidizing power. When the reaction is complete, i.e. when an OP equal to zero is reached, 185 g of compound are discharged by filtration while 145 g of th same remain in the autoclave to be used as solvent for the subsequent tests and for the subsequent example.

The compound is characterized by NMR$^{19}$F and it results to be an acid fluoride of formula (I) wherein T=COF, X=F, n=q=0, and results to have a number average molecular weight equal to 1,500, m/p=0.75, and an average functionality due to the —COF groups equal to 1.96.

The test has been repeated with the same modalities by using everytime about 300 g of the same peroxidic perfluoropolyether and the catalyst used in the previous test. After a cycle of 30 consecutive tests no catalyst deactivation is evident.

Example 2

In the equipment of the Example 1 containing 145 g of the obtained acid fluoride, 10 g of Pd/BaF$_2$ catalyst containing 1.5% by weight of Pd with respect to the catalyst weight and 350 g of the peroxidic perfluoropolyether used in the Example 1, are introduced.

It is heated in nitrogen flow to 125°–130° C. and hydrogen is introduced for 30 minutes with a 15 NL/h flow at a operating pressure of 3 atm. It is cooled to 20° C. in nitrogen flow and samples are drawn to analytically check the oxidizing power. When the reaction is complete, 120 g of the compound are discharged by filtration while 145 g of the same remain in the autoclave to be used as solvent for the subsequent tests and for the subsequent example.

The compound is characterized by NMR$^{19}$F and it results to be an acid fluoride of formula (I) wherein T=COF, X=F, n=q=0, and results to have a number average molecular weight equal to 1,540, m/p=0.75, and an average functionality due to the —COF groups equal to 1.96.

The test has been repeated with the same modalities using everytime about 300 g of the same peroxidic perfluoropolyether and the catalyst used in the previous test. After a cycle of 30 consecutive tests no catalyst deactivation is evident.

Example 3

10 g of Pd/AlF$_3$ catalyst containing 1.5% by weight of Pd with respect to the catalyst weight and 300 g of the peroxidic perfluoropolyether of the Example 1, are introduced into the equipment of the Example 1. It is heated in nitrogen flow to 125°–130° C. and hydrogen is introduced for 30 minutes with a 15 NL/h flow at a operating pressure of 3 atm. It is cooled to 20° C. in nitrogen flow and samples are drawn to analytically check the oxidizing power. When the reaction is complete, 100 g of the compound are discharged by filtration while 145 g of the same remain in the autoclave to be used as solvent for the subsequent tests and for the subsequent example.

The compound is characterized by NMR$^{19}$F and it results to be an acid fluoride of formula (I) wherein T=COF, X=F, n=q=0, and results to have a number average molecular weight equal to 1,520, m/p=0.75, and an average functionality due to the —COF groups equal to 1.96.

The testing is repeated with the same modalities by refeeding everytime about 300 g of the peroxidic perfluoropolyether of the Example 1 and the catalyst used in the previous test. After a cycle of 30 consecutive tests no catalyst deactivation is evident.

Example 4

10 g of Pd/MgF$_2$ catalyst containing 1.5% by weight of Pd with respect to the catalyst weight and 388 g of the peroxidic perfluoropolyether of the Example 1, are intotroduced into the equipment of the Example 1. It is heated in nitrogen flow to 125°–130° C. and hydrogen is introduced for 30 minutes with a 15 NL/h flow at a operating pressure of 3 atm. It is cooled to 20° C. in nitrogen flow and samples are drawn to analytically check the oxidizing power. When the reaction is complete, 175 g of compound are discharged by filtration while 145 g of the same remain in the autoclave to be used as solvent for the subsequent tests and for the subsequent example.

The compound is characterized by NMR$^{19}$F and it results to be an acid fluoride of formula (I) wherein T=COF, X=F, n=q=0, and results to have a number average molecular weight equal to 1,500, m/p=0.75, and an average functionality due to the —COF groups equal to 1.96.

The testing is repeated with the same modalities by refeeding everytime about 300 g of the peroxidic perfluoropolyether of the Example 1 and the catalyst used in the previous test. After a cycle of 30 consecutive tests no catalyst deactivation is evident.

Example 5 (Comparative)

3 g of a Pd/C catalyst containing 5% by weight of Pd with respect to the catalyst weight and 300 g of the peroxidic perfluoropolyether of the Example 1, are introduced into the equipment described in the Example 1. One proceeds then as described in the Example 1 and when the reaction is complete (OP=0), 102 g of compound are obtained which are discharged by filtration while 145 g of the same compound remain in the autoclave to be used as solvent for the subsequent tests and for the subsequent example.

The compound is characterized by NMR$^{19}$F and it results to be an acid fluoride of formula (I) wherein T=COF, X=F, n=q=0, and results to have a number average molecular weight equal to 1,500, m/p=0.75, and an average functionality due to the —COF groups equal to 1.96.

The test has been repeated with the same modalities by using about 300 g of the peroxidic perfluoropolyether of the Example 1 and the catalyst used in the previous test.

The compound obtained in this second test shows an OP equal to 0.11, value showing an incomplete reduction of the peroxidic perfluoropolyether.

After five reuses the catalyst is completely deactivated.

Example 6 (Comparative)

3 g of a Pd/BaSO$_4$ catalyst containing 5% by weight of Pd with respect to the catalyst weight and 300 g of the peroxidic perfluoropolyether used in the Example 1, are introduced into the equipment described in the Example 1. One proceeds then as described in the Example 1 and when the reaction is complete (OP=0), 104 g of compound are obtained and discharged by filtration, while 145 g of the same compound remain in the autoclave to be used as solvent for the subsequent tests.

The compound is characterized by NMR$^{19}$F and it results to be an acid fluoride of formula (I) wherein T=COF, X=F, n=q=0, and results to have a number average molecular weight equal to 1,496, m/p=0.75, and an average functionality due to the —COF groups equal to 1.96.

The test has been repeated with the same modalities by using about 300 g of peroxidic perfluoropolyether of the Example 1 and the catalyst used in the previous test. After eight consecutive tests there is no complete conversion (residual OP=0.09).

After eleven reuses it results a residual OP equal to 0.81.

Example 7

15.2 g of the peroxidic perfluoropolyether of the Example 1 and 0.45 g of Pd/CaF$_2$ catalyst containing 1.5% of Pd by weight with respect to the catalyst weight, are introduced into a 50 ml capped fluorinated-polymeric test tube, stirred with a magnet and equipped with a thin bubbling pipe to introduce hydrogen and nitrogen at atmospheric pressure and with an outlet connected to a bubble-counter to visualize the gas flow.

The mixture is heated at 120°–125° C. and hydrogen is introduced from the bubbler by controlling the outflow flowing from the bubble-counter.

It is hydrogenated for about 4 hours. It is cooled to room temperature in nitrogen flow and the compound is discharged by filtration.

The NMR$^{19}$F analysis shows the disappearance of the peroxidic bonds and their complete transformation into the corresponding acyl fluorides.

The test is repeated with the same modalities everytime by feeding the catalyst recovered from the previous test and about 15 g of the peroxidic perfluoropolyether of the Example 1.

After a cycle of 30 consecutive tests no deactivation of the catalyst is evident.

Example 8

The Example 7 is repeated by using 14.99 g of peroxidic perfluoropolyether and 0.45 g of Pt/CaF$_2$ catalyst containing 1.5% by weight of Pt with respect to the catalyst weight.

The operations of the previous Example are repeated. After 4 hours it is cooled to room temperature in nitrogen flow and the compound is recovered by filtration.

The NMR$^{19}$F analysis shows the disappearance of the peroxidic bonds and the complete transformation of the peroxidic perfluoropolyethers into the corresponding acyl fluorides.

The test is repeated with the same modalities everytime time by refeeding the catalyst recovered from the previous test and about 15 g of the peroxidic perfluoropolyether of the Example 1.

After a cycle of 30 consecutive tests no deactivation of the catalyst is evident.

Example 9

Example 7 is repeated by using 15.14 g of peroxidic perfluoropolyether and 0.45 g of Rh/CaF$_2$ catalyst containing 1.5% of Rh by weight with respect to the catalyst.

The operations of the previous Example are repeated. After 4 hours it is cooled to room temperature in nitrogen flow and the compound is recovered by filtration.

The NMR$^{19}$F analysis shows the disappearance of the peroxidic bonds and the complete transformation of the peroxidic perfluoropolyethers into the corresponding acyl fluorides.

The test is repeated with the same modalities by refeeding the catalyst recovered from the previous test and about 15 g of peroxidic perfluoropolyether.

After a cycle of 30 consecutive tests no deactivation of the catalyst is evident.

Example 10 (Comparative)

10 g of peroxidic perfluoropolyether of the Example 1 and 0.3 g of Pd/CaF$_2$ catalyst containing 1.5% by weight of Pd with respect to the catalyst weight, are introduced into the equipment described in the Example 7.

It is heated up to 130° C. and it is left at said temperature for 5 hours without feeding hydrogen.

It is cooled to room temperature, it is diluted with inert fluorinated solvent and the compound is recovered by filtration. The solvent is distilled at low temperature (40° C.) and at reduced pressure while the compound is analyzed by titration and by NMR analysis. The initial peroxidic perfluoropolyether structure and its OP result unchanged.

Example 11 (Comparative)

10 g of peroxidic perfluoropolyether of the Example 1 and 0.3 g of Pd/CaF$_2$ catalyst containing 1.5% by weight of Pd with respect to the catalyst weight, are introduced into the equipment described in the Example 7.

It is heated up to 150° C. and it is left at said temperature for 5 hours without feeding hydrogen.

It is cooled to room temperature, it is diluted with inert fluorinated solvent and the compound is recovered by filtration.

The solvent is distilled at low temperature (40° C.) and at reduced pressure while the compound is analyzed by titration and by NMR analysis.

The OP of the obtained compound results to be equal to 0.95, corresponding to a conversion of the peroxidic groups equal to 5% with formation of 0.1 mmole of —COF groups (20% of the converted compound).

What is claimed is:

1. A process for the preparation of perfluoropolyethers having at least one —COF end group of formula:

$$\text{T-CFX'—O—R}_f\text{—CFX—COF} \quad (I)$$

wherein:

T is equal to COF, F, or C$_1$–C$_3$ perfluoroalkyl;

X and X' are equal to or different from each other and are F or —CF$_3$;

R$_f$ is selected from:
—(C$_2$F$_4$O)$_m$(CF$_2$CF(CF$_3$)O)$_n$(CF$_2$O)$_p$(CF(CF$_3$)O)$_q$—
wherein:
the sum n+m+p+q ranges from 2 to 200,
the (p+q)/(m+n+p+q) ratio is lower than or equal to 10:100,
the n/m ratio ranges from 0.2 to 6;
m, n, p, and q are equal to or different from each other and when m and n range from 1 to 100 then p and q range from 0 to 80;
the units with n, m, p, q indexes being randomly distributed along the chain,
—(CF$_2$CF$_2$CF$_2$O)$_r$—
wherein r ranges from 2 to 200,
—(CF(CF$_3$)CF$_2$O)$_s$—
wherein s ranges from 2 to 200, by reduction of the corresponding perfluoropolyethers containing peroxidic bonds, using gaseous hydrogen in the presence of a catalyst comprising metals of the VIII group supported on metal fluorides, optionally in the presence of perfluorinated solvents, inert at a temperature from 20° C. to 140° C. and at a pressure between 1 and 50 atm.

2. A process according to claim 1, wherein R$_f$ is selected from one of the group consisting of:
—(CF$_2$CF$_2$O)$_m$—(CF$_2$O)$_p$— and —(CF$_2$CF(CF$_3$)O)$_n$—(CF$_2$O)$_p$—(CF(CF$_3$)O)$_q$.

3. A process according to claim 2, wherein the metal of the VIII group is Pd, Pt, or Rh.

4. A process according to claim 3, wherein the metal fluoride is selected in the group consisting of CaF$_2$, BaF$_2$, MgF$_2$, and AlF$_3$.

5. A process according to claim 4, wherein the concentration of the VIII group metal on the metal fluoride is comprised between 0.1% and 10% with respect to the catalyst total weight.

6. A process according to claim 5, wherein the amount of catalyst used is in the range 1%–10% by weight with respect to the peroxidic perfluoropoly-ether.

7. The process of claim 1, wherein the (p+q)/(m+n+p+q) ratio is between 0.5:100 and 4:100.

8. The process of claim 1, wherein the n/m ratio ranges from 0.5 to 3.

9. The process of claim 1, wherein m and n range from 1 to 80.

10. The process of claim 1, wherein p and q range from 0 to 50.

11. The process of claim 1, wherein the temperature is from 80° C. to 130° C.

12. The process of claim 1, wherein the pressure is between 1 and 10 atm.

13. The process of claim 3, wherein the metal is Pd.

14. The process of claim 4, wherein the metal fluoride is CaF$_2$.

15. The process of claim 5, wherein the catalyst total weight is between 1% and 2% by weight.

16. The process of claim 6, wherein the amount of used catalyst is in the range 1% to 5% by weight.

* * * * *